(12) United States Patent
Vyas et al.

(10) Patent No.: US 8,029,943 B2
(45) Date of Patent: Oct. 4, 2011

(54) METHOD TO MAKE CONDUCTIVE HYDROPHILIC FUEL CELL ELEMENTS

(75) Inventors: Gayatri Vyas, Rochester Hills, MI (US);
Thomas A. Trabold, Pittsford, NY (US);
Stephen William Gaarenstroom, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1864 days.

(21) Appl. No.: 11/068,489

(22) Filed: Feb. 28, 2005

(65) Prior Publication Data
US 2006/0194095 A1    Aug. 31, 2006

(51) Int. Cl.
*H01M 8/04* (2006.01)
*H01M 4/66* (2006.01)

(52) U.S. Cl. .................. 429/514; 429/519; 427/119

(58) Field of Classification Search .............. 429/34
See application file for complete search history.

(56) References Cited

U.S. PATENT DOCUMENTS

| | | |
|---|---|---|
| 2,852,415 A | 9/1958 | Colbert et al. |
| 4,175,165 A | 11/1979 | Adlhart |
| 5,840,414 A | 11/1998 | Bett et al. |
| 5,942,349 A | 8/1999 | Badwal et al. |
| 6,258,476 B1 | 7/2001 | Cipollini |
| 6,291,093 B1 | 9/2001 | Kindler et al. |
| 6,372,376 B1 | 4/2002 | Fronk et al. |
| 6,733,911 B2 | 5/2004 | Kawahara |
| 2001/0004501 A1* | 6/2001 | Yi et al. .................. 429/34 |
| 2001/0021470 A1* | 9/2001 | May et al. ................ 429/44 |
| 2002/0081478 A1* | 6/2002 | Busenbender ............. 429/34 |
| 2002/0187379 A1* | 12/2002 | Yasuo et al. .............. 429/34 |
| 2003/0228512 A1 | 12/2003 | Vyas et al. |
| 2004/0091768 A1 | 5/2004 | Elhamid et al. |
| 2006/0105222 A1 | 5/2006 | Elhamid et al. |

FOREIGN PATENT DOCUMENTS

| | | |
|---|---|---|
| CN | 1421946 A | 6/2003 |
| EP | 0 969 540 A2 | 2/2000 |
| JP | 2001-325966 (A) | 11/2001 |

* cited by examiner

*Primary Examiner* — Barbara Gilliam
*Assistant Examiner* — Maria J Laios
(74) *Attorney, Agent, or Firm* — John A. Miller; Miller IP Group, PLC

(57) ABSTRACT

A flow field plate for a fuel cell that has one or more outer layers that makes the plate more conductive and hydrophilic. In one embodiment, the coating is co-deposited as combination of a conductive material and a metal oxide coating. A suitable conductive material is gold and suitable metal oxides include $SiO_2$, $HfO_2$, $ZrO_2$, $Al_2O_3$, $SnO_2$, $Ta_2O_5$, $Nb_2O_5$, $MoO_2$, $IrO_2$, $RuO_2$ and mixtures thereof. The conductive material and metal oxide can also be deposited as two separate layers, where the metal oxide is the outer layer. According to another embodiment, a metal layer is deposited on the plate with nanopores that provide the hydrophilicity. Also, doping ions can be added to the metal oxide to provide low fluoride solubility of the coating to control the rate that hydrofluoric acid etches away the oxide layer.

19 Claims, 2 Drawing Sheets

METHOD TO MAKE CONDUCTIVE HYDROPHILIC FUEL CELL ELEMENTS

BACKGROUND OF THE INVENTION

1. Field of the Invention

This invention relates generally to bipolar plates for fuel cells and, more particularly, to a process for fabricating a bipolar plate for a fuel cell that includes depositing one or more layers on the plate to make it both conductive and hydrophilic.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid-polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. For the automotive fuel cell stack mentioned above, the stack may include about two hundred bipolar plates. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, the oxide layer is not conductive, and thus increases the internal resistance of the fuel cell, reducing its electrical performance. Also, the oxide layer makes the plate more hydrophobic.

US Patent Application Publication No. 2003/0228512, assigned to the assignee of this application and herein incorporated by reference, discloses a process for depositing a conductive outer layer on a flow field plate that prevents the plate from oxidizing and increasing its ohmic contact. U.S. Pat. No. 6,372,376, also assigned to the assignee of this application, discloses depositing an electrically conductive, oxidation resistant and acid resistant coating on a flow field plate. US Patent Application Publication No. 2004/0091768, also assigned to the assignee of this application, discloses depositing a graphite and carbon black coating on a flow field plate for making the flow field plate corrosion resistant, electrically conductive and thermally conductive.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, the water accumulates within the flow channels because the flow rate of the reactant gas is too low to force the water out of the channels. As the water accumulates, it forms droplets that continue to expand because of the hydrophobic nature of the plate material. The contact angle of the water droplets is generally about 90° in that the droplets form in the flow channels substantially perpendicular to the flow of the reactant gas. As the size of the droplets increases, the flow channel is closed off, and the reactant gas is diverted to other flow channels because the channels flow in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the anode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

SUMMARY OF THE INVENTION

In accordance with the teachings of the present invention, a flow field plate or bipolar plate for a fuel cell is disclosed that has one or more outer layers or coatings that make the plate more electrically conductive and hydrophilic. In one embodiment, the coating is co-deposited as a combination of a conductive material and a metal oxide. A suitable conductive material is gold and suitable metal oxides include $SiO_2$, $HfO_2$, $ZrO_2$, $Al_2O_3$, $SnO_2$, $Ta_2O_5$, $Nb_2O_5$, $MoO_2$, $IrO_2$, $RuO_2$ and mixtures thereof. The conductive material and metal oxide can also be deposited as two separate layers, where the metal oxide layer is the outer layer. According to another embodiment, a metal layer is deposited on the plate to have nanopores that provide the hydrophilicity. Also, doping ions can be added to the metal oxide to provide a low fluoride solubility of the coating to control the rate that hydrofluoric acid etches away the metal oxide coating.

The coatings can be deposited on the bipolar plate by any suitable physical deposition process, chemical vapor deposition (CVD) process, thermal spraying or by sol-gel. Examples of physical vapor deposition processes include electron beam evaporation, magnetron sputtering and pulsed plasma processes. Examples of chemical vapor deposition processes include plasma enhanced CVD or atomic layer deposition processes.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a technique for fabricating bipolar plates for a fuel cell that makes the bipolar plates more conductive and hydrophilic is merely exemplary in nature, and is in no way intended to limit the invention or its applications or uses.

Figure 1:
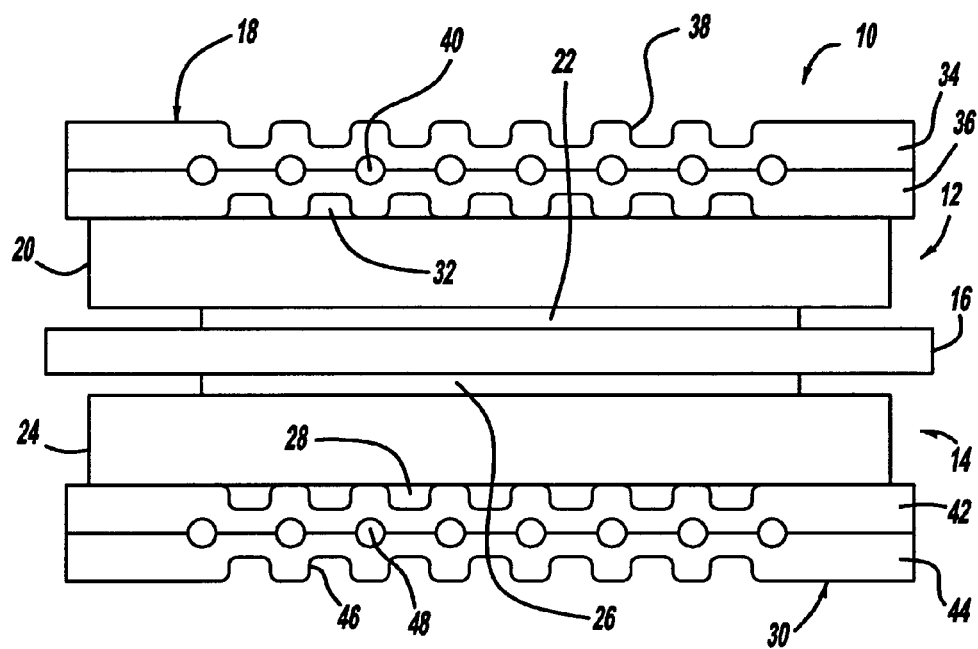
FIG. 1 is a cross-sectional view of a fuel cell in a fuel cell stack that includes bipolar plates having one or more coatings that make the plate more conductive and hydrophilic, according to an embodiment of the present invention.

FIG. 1 is a cross-sectional view of a fuel cell 10 that is part of a fuel stack of the type discussed above. The fuel cell 10 includes a cathode side 12 and an anode side 14 separated by an electrolyte membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are provided between the fuel cells in the fuel cell stack. A hydrogen reactant gas flow from flow channels 28 in the bipolar plate 30 reacts with the catalyst layer 26 to dissociate the hydrogen ions and the electrons. Airflow from flow channels 32 in the bipolar plate 18 reacts with the catalyst layer 22. The hydrogen ions are able to propagate through the membrane 16 where they electrochemically react with the airflow and the return electrons in the catalyst layer 22 to generate water as a by-product.

In this non-limiting embodiment, the bipolar plate 18 includes two sheets 34 and 36 that are stamped and welded together. The sheet 36 defines the flow channels 32 and the sheet 34 defines flow channels 38 for the anode side of an adjacent fuel cell to the fuel cell 10. Cooling fluid flow channels 40 are provided between the sheets 34 and 36, as shown. Likewise, the bipolar plate 30 includes a sheet 42 defining the flow channels 28, a sheet 44 defining flow channels 46 for the cathode side of an adjacent fuel cell, and cooling fluid flow channels 48.

According to the invention, the bipolar plates 18 and 30 are coated with one or more layers to make them both more conductive and hydrophilic. By making the bipolar plates 18 and 30 more hydrophilic, the contact angle of the water that forms in the flow channels 28 and 32 is reduced, preferably below 40°. Particularly, the hydrophilicity of the plates 18 and 30 causes the water to form a film within the flow channels 28 and 32 instead of water droplets so that the water does not significantly block the flow channel. By making the bipolar plates 18 and 30 more conductive, the electrical contact resistance and the ohmic losses in the fuel cell 10 are reduced, thus increasing cell efficiency. Also, a reduction in compression force in the stack can be provided, addressing certain durability issues with the stack.

Figure 2:
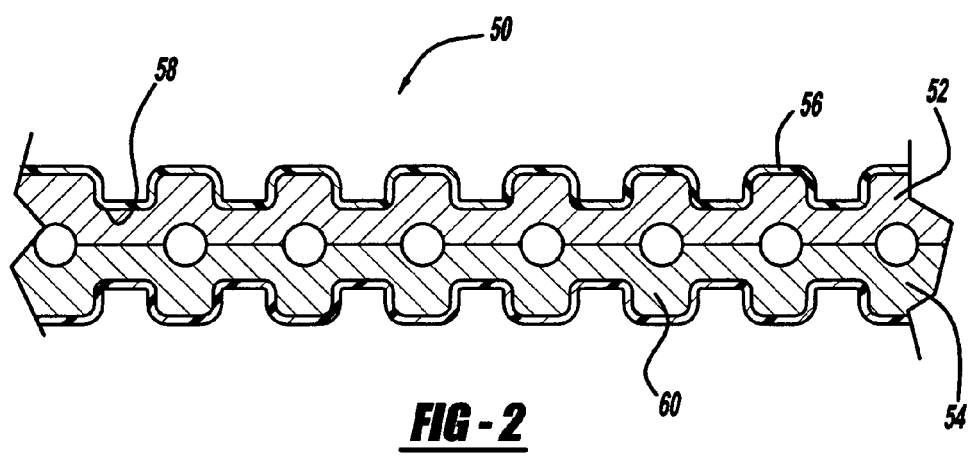
FIG. 2 is a broken-away, cross-sectional view of a bipolar plate for a fuel cell including co-deposited conductive and metal oxide coating.

FIG. 2 is a broken-away, cross-sectional view of a bipolar plate 50 including two sheets 52 and 54, flow channels 58 and lands 60 that can be used for the bipolar plates 18 and 30 in the fuel cell 10, according to an embodiment of the present invention. The bipolar plate 50 includes a porous coating 56 that is deposited on the outer surface of the plate 50 so that both of the sheets 52 and 54 are covered. In this embodiment, the coating 56 is a co-deposited coating comprised of dual constituents that provides a low contact resistance and hydrophilicity for low load stability. For example, a metal in the coating 56 can be any suitable low resistive metal for the purposes described herein, such as gold. Examples of suitable hydrophilic materials for the coating 56 include, but are not limited to, various metal oxides, such as silicon dioxide ($SiO_2$), hafnium dioxide ($HfO_2$), zirconium dioxide ($ZrO_2$), aluminum oxide ($Al_2O_3$), stannic oxide ($SnO_2$), tantalum pent-oxide ($Ta_2O_5$), niobium pent-oxide ($Nb_2O_5$), molybdenum dioxide ($MoO_2$), iridium dioxide ($IrO_2$), ruthenium dioxide ($RuO_2$) and mixtures thereof. By providing the mixture of the high conductivity metal and the hydrophilic metal oxide, the channels 58 provide the desired hydrophilicity of the plate 50 so that water forms a film and does not form slugs within the flow channels 58, and a low ohmic contact at the lands 60 of the plate 50 so that it makes a good electrical contact with the diffusion media layer.

Before the coating 56 is deposited on the bipolar plate 50, the bipolar plate 50 is cleaned by a suitable process, such as ion beam sputtering, to remove the resistive oxide film on the outside of the plate 50 that may have formed. The metal oxide material can be co-deposited on the bipolar plate 50 by any suitable technique including, but not limited to, physical vapor deposition processes, chemical vapor deposition processes, thermal spraying processes and sol-gel. Suitable examples of physical vapor deposition processes include electron beam evaporation, magnetron sputtering and pulsed plasma processes. Suitable chemical vapor deposition processes include plasma enhanced CVD and atomic layer deposition processes. The '512 application discloses an ion-assisted physical vapor deposition process that is suitable for depositing the coating.

As is understood in the art, hydrofluoric acid (HF) is generated as a result of degradation of the perfluorosulfonic ionomer in the membrane 16. The hydrofluoric acid has a corrosive effect on the various coating materials discussed herein and also etches the stainless steel, or other metal, of the bipolar plates. Therefore, the thickness of the coating 56 needs to be sufficient to handle the degradation caused by the fluoride ions in the hydrofluoric acid for the desired lifetime of the fuel cell 10. In one non-limiting embodiment, the coating 56 is about 10 nm thick. Certain of the suitable metal oxide materials, such as $ZrO_2$, are more resistant to the fluoride ions, and still provide the desired hydrophilicity, which could be more desirable in certain fuel cell stacks. Moreover, $ZrO_2$ acts as a scavenger of fluoride ions, further enhancing its durability in applications involving stainless steel.

Figure 3:
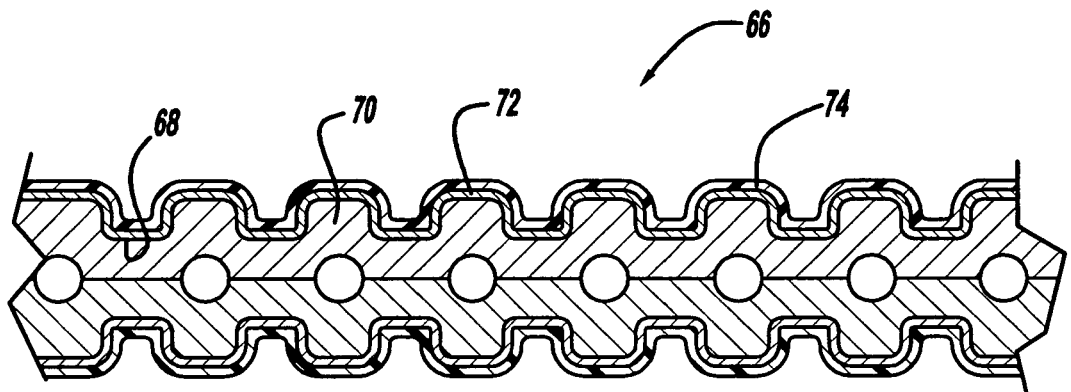
FIG. 3 is a broken-away, cross-sectional view of a bipolar plate for a fuel cell including a bottom conductive layer and a top metal oxide layer, according to another embodiment of the present invention.

FIG. 3 is a broken-away, cross-sectional view of a bipolar plate 66 including flow channels 68 and lands 70 that can be used in the fuel cell 10, according to another embodiment of the present invention. In this embodiment, the conductive material and the metal oxide are not co-deposited as a single layer in a single processing step, but are deposited in separate deposition steps as separate layers. Particularly, the bipolar plate 66 includes a conductive layer 72 of a conductive material, such as gold, deposited as one process, and a hydrophilic layer 74 of a porous metal oxide, such as silicon dioxide, deposited as another process. The '512 application discloses processes for depositing a gold layer on a flow field plate. This further decreases the contact resistance of the lands 70, while providing the desired hydrophilicity of the channels 68. Alternately, the conductive layer 72 can be a polymeric organic layer, such as EBO23 and EBOO8 available from Acheson Colloids of Port Huron, Mich., that includes a carbon binder that provides the desired conductivity.

Figure 4:
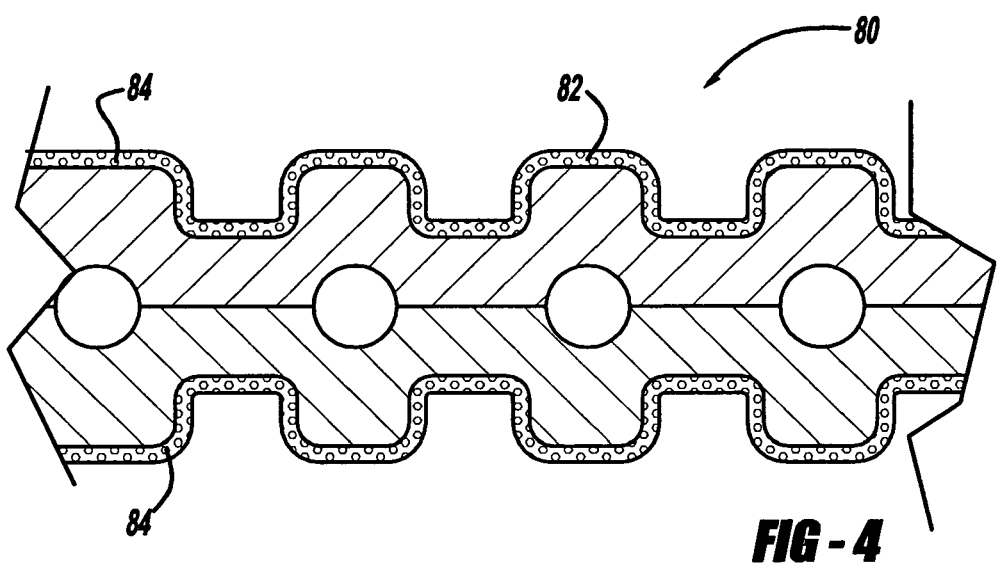
FIG. 4 is a broken-away, cross-sectional view of a bipolar plate for a fuel cell including a metal layer having random nanopores therein, according to another embodiment of the present invention.

FIG. 4 is a broken-away, cross-sectional view of a bipolar plate 80 that can be used in the fuel cell 10, according to another embodiment of the invention. In this embodiment, the bipolar plate 80 is coated with a nano-porous conductive layer 82 that exposes the bipolar plate 80 through random nanopores 84. This can be done by depositing a suitable metal, such as gold, with another metal, such as silver, where an etchant material is used to remove the other metal to define the nanopores 84. In this embodiment, the nanopores 84 in the layer 82 act to provide the hydrophilicity by providing a hydrophilic surface morphology so that the secondary metal oxide layer is not needed.

As mentioned above, silicon dioxide ($SiO_2$) is a good material to provide the desired hydrophilicity. According to another embodiment of the present invention, a doping ion is added to the silicon dioxide, or other metal oxide, to provide low fluoride solubility. As the silicon dioxide is etched by the hydrofluoric acid, the doping ions react with the hydrofluoric acid to make an insoluble fluoride that is formed on an outer surface of the coating that reduces the etching rate of the coating. Suitable examples of doping ions include Ca, Fe, Al, Ni, Sr, Mg, Pb, Sc, etc. These doping ions generate the insoluble fluorides, such as $BaF_2$, $CaF_2$, $PbF_2$, LiF, $MgF_2$, $ScF_3$ and $SrF_2$. For these examples, LiF and $BaF_2$ are the most soluble fluorides and $ScF_3$ and $SrF_2$ are the least soluble fluorides. The low fluoride solubility makes the metal oxide coating have a longer lifetime in a fuel cell because the hydrofluoric acid induced etching of the metal oxide coating is reduced as a result of the formation of insoluble fluoride salts on the surface of the coating.

The choice of the doping element and the concentration of the doping element are typically dependent on the severity of the hydrofluoric acid concentration in the fuel cell stack and the desired lifetime of the coating until it has been completely etched away by the acid.

It is not desirable to use the doping ions to completely eliminate the etching of the oxide coating by the hydrofluoric acid. This is because contaminants typically adhere to the outer surface of the coating, reducing its hydrophilicity. A modest rate of etching acts to remove the hydrophobic surface contaminants and expose fresh, active hydrophilic surface layers of the coating. The choice of doping elements and concentration in the metal oxide coating should be matched to the severity of the hydrofluoric acid etching. Too low of a rate of etching could lead to a build-up of hydrophobic contaminants, and too high of a rate of etching may result in the metal oxide coating being etched away before the end of the useful life of the fuel cell stack.

Certain doping elements when dissolved in the metal oxide coating may have high mobility in aqueous solutions and in the adjacent MEA, leading to the binding of ions to the acidic sites of the perfluorosulfonic ionomer in the membrane and reducing cell efficiency. For example, the doping ions Ca and Fe are more mobile and more binding in the ionomer than Al, Sc and Ni. This undesirable bonding property of a doping element is another selection criteria for formulating the best doped metal oxide coating for a particular bipolar plate.

Figure 5:
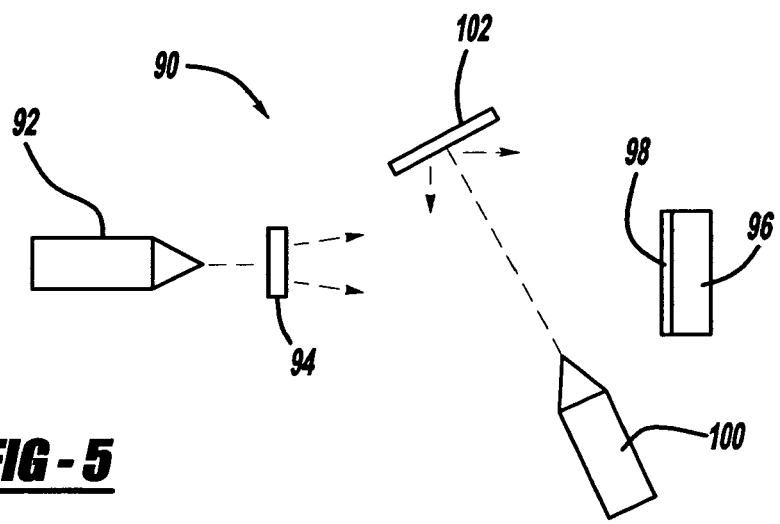
FIG. 5 is a plan view of a system for depositing the various coatings and layers for the bipolar plates of the invention.

FIG. 5 is a plan view of a system 90 for depositing the various coatings on the bipolar plates discussed above. The system 90 is intended to represent any of the techniques mentioned above, including, but not limited to, physical vapor deposition processes, chemical vapor deposition processes, thermal spraying processes and sol-gel. In the system 90, an electron gun 92 heats a material 94, such as gold, that causes the material to be vaporized and deposited on a substrate 96, representing the bipolar plate, to form a coating 98 thereon. In another process, the system 90 includes an ion gun 100 that directs a beam of ions to a sputtering surface 102 that releases material, such as a metal oxide, to deposit the coating 98.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell comprising a flow field plate being made of a plate material, said flow field plate including a plurality of flow channels responsive to a reactant gas, said flow field plate further including at least one coating that makes the flow field plate both hydrophilic and conductive, said coating being a metal that is conductive and that includes nanopores formed as a result of a material being removed from the coating to make the coating hydrophilic.

2. The fuel cell according to claim 1 wherein the plate material is selected from the group consisting of stainless steel, titanium and aluminum and a polymer-carbon composite based material.

3. The fuel cell according to claim 1 wherein the metal is gold.

4. The fuel cell according to claim 1 wherein the coating is about 10 nm thick.

5. The fuel cell according to claim 1 wherein the coating includes doping ions.

6. The fuel cell according to claim 5 wherein the doping ions are selected from the group consisting of Ca, Fe, Al, Ni, Sr, Mg, Pb and Sc.

7. The fuel cell according to claim 5 wherein the doping ions generate insoluble fluorides that adhere to an outer surface of the coating in response to hydrofluoric acid.

8. The fuel cell according to claim 1 wherein the at least one coating is deposited on the flow field plate by a process selected from the group consisting of an electron beam evaporation process, magnetron sputtering, a pulsed plasma process, plasma enhanced chemical vapor deposition, an atomic layer deposition process, thermal spraying and sol-gel.

9. The fuel cell according to claim 1 wherein the flow field plate is selected from the group consisting of anode-side flow field plates and cathode-side flow field plates.

10. The fuel cell according to claim 1 wherein the fuel cell is part of a fuel cell stack on a vehicle.

11. The fuel cell according to claim 1 wherein the removed material is silver.

12. A fuel cell comprising:
a membrane; and
a flow field plate positioned proximate to the membrane, said flow field plate including a plurality of flow channels responsive to a reactant gas for delivering the gas to the membrane, said flow field plate including a coating that makes the flow field plate both conductive and hydrophilic, said coating being a metal that is conductive and that includes nanopores formed as a result of a material being removed from the coating to make the coating hydrophilic.

13. The fuel cell according to claim 12 wherein the coating includes doping ions.

14. The fuel cell according to claim 13 wherein the doping ions are selected from the group consisting of Ca, Fe, Al, Ni, Sr, Mg, Pb and Sc.

15. The fuel cell according to claim 13 wherein the doping ions generate insoluble fluorides that adhere to an outer surface of the coating in response to hydrofluoric acid.

16. The fuel cell according to claim 12 wherein the coating is deposited on the flow field plate by a process selected from the group consisting of an electron beam evaporation process, magnetron sputtering, a pulsed plasma process, plasma enhanced chemical vapor deposition, an atomic layer deposition process, thermal spraying and sol-gel.

17. The fuel cell according to claim 12 wherein the flow field plate is selected from the group consisting of anode-side flow field plates and cathode-side flow field plates.

18. The fuel cell according to claim 12 wherein the removed material is silver.

19. The fuel cell according to claim 12 wherein the metal is gold.

\* \* \* \* \*